United States Patent
Clinton et al.

(10) Patent No.: US 9,816,665 B2
(45) Date of Patent: Nov. 14, 2017

(54) EQUIPMENT BOOM WITH LOCKING FEATURE

(71) Applicants: Glenn A. Clinton, Belvidere, IL (US); Gary B. Clinton, Belvidere, IL (US)

(72) Inventors: Glenn A. Clinton, Belvidere, IL (US); Gary B. Clinton, Belvidere, IL (US)

(73) Assignee: Clinton Electronics Corporation, Loves Park, IL (US)

( * ) Notice: Subject to any disclaimer, the term of this patent is extended or adjusted under 35 U.S.C. 154(b) by 264 days.

(21) Appl. No.: 14/599,642

(22) Filed: Jan. 19, 2015

(65) Prior Publication Data

US 2015/0153000 A1 Jun. 4, 2015

(51) Int. Cl.
| | |
|---|---|
| F16M 13/02 | (2006.01) |
| F16M 11/10 | (2006.01) |
| F16M 11/20 | (2006.01) |
| F16M 11/28 | (2006.01) |

(52) U.S. Cl.
CPC .......... *F16M 13/027* (2013.01); *F16M 11/10* (2013.01); *F16M 11/2021* (2013.01); *F16M 11/28* (2013.01); *F16M 2200/027* (2013.01); *Y10S 248/917* (2013.01); *Y10S 248/92* (2013.01)

(58) Field of Classification Search
CPC ............... F16M 11/28; F16M 13/027; F16M 2200/027; Y10S 248/92; Y10S 248/917; Y10S 248/919; E04B 9/006; F16B 7/105; F16B 7/1472; E04C 3/005; Y10T 403/32467

USPC .......................................... 248/333, 917–924
See application file for complete search history.

(56) References Cited

U.S. PATENT DOCUMENTS

| | | | | |
|---|---|---|---|---|
| 3,842,561 A | * | 10/1974 | Wong | E04B 9/18 248/354.4 |
| 4,807,837 A | * | 2/1989 | Gawlik | A61M 5/1415 211/196 |
| 5,487,524 A | * | 1/1996 | Bergetz | F16F 15/085 248/343 |
| 2002/0194792 A1 | * | 12/2002 | Feldpausch | A47B 21/00 52/36.1 |
| 2004/0135050 A1 | * | 7/2004 | Lee | F16M 11/10 248/317 |
| 2008/0128574 A1 | * | 6/2008 | Walters | F16M 11/08 248/324 |
| 2011/0121151 A1 | * | 5/2011 | Stifal | F16M 11/10 248/284.1 |

FOREIGN PATENT DOCUMENTS

KR 2002092702 A * 12/2002

OTHER PUBLICATIONS

Machine Translation of KR2002092702A, Mar. 24, 2016.*
Derwent 2003-360538, Kim, Dec. 12, 2012.*

* cited by examiner

*Primary Examiner* — Ryan D Kwiecinski
(74) *Attorney, Agent, or Firm* — Reinhart Boerner Van Deuren P.C.

(57) ABSTRACT

An equipment boom and methods of installation are provided. The equipment boom includes a base member and at least one extension slidably received by the base member. A fixing arrangement is also provided which allows for fixing the axial length of the equipment boom.

14 Claims, 19 Drawing Sheets

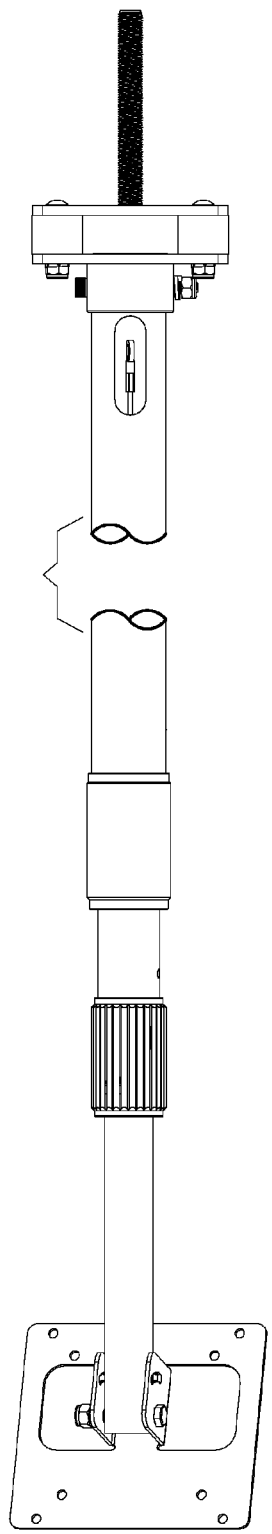 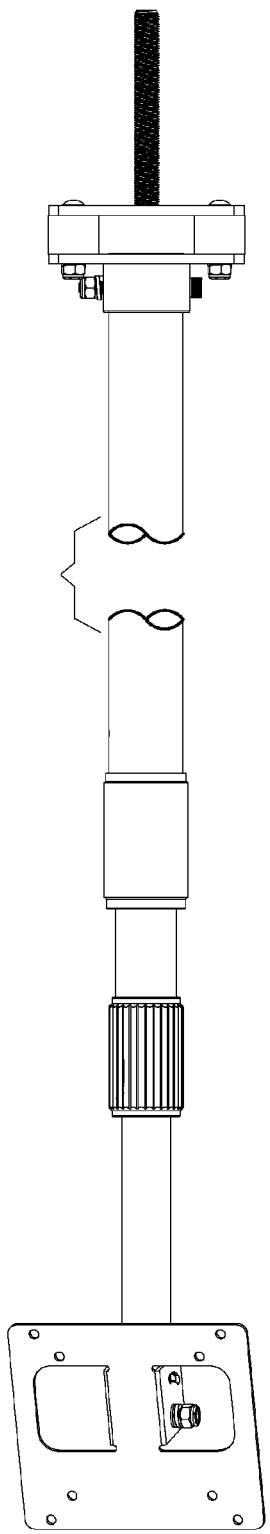
FIG. 12  FIG. 13

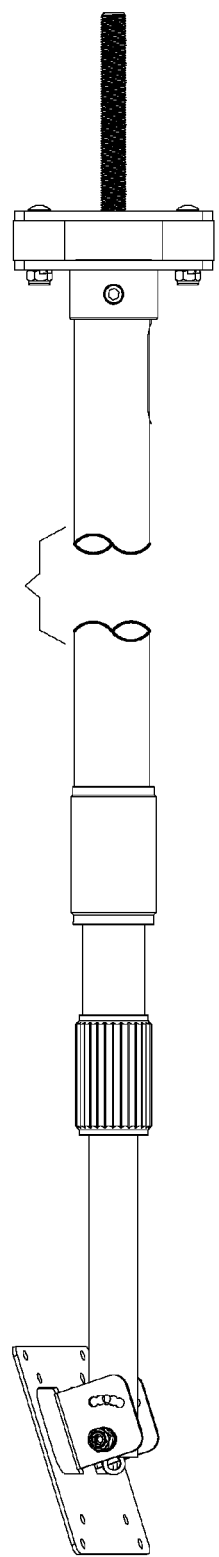 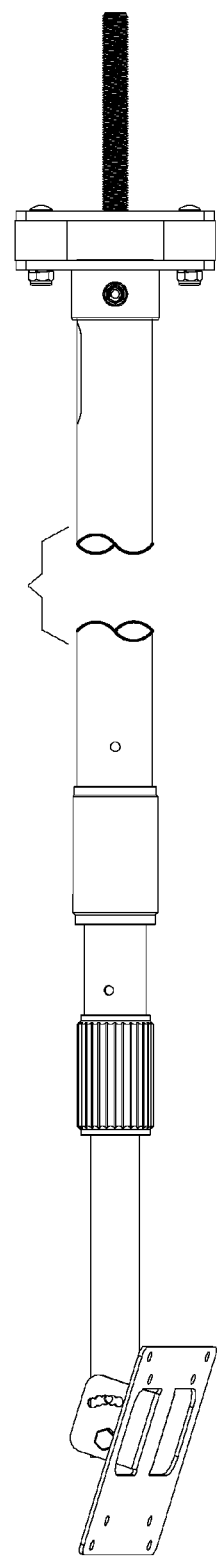
FIG. 14     FIG. 15

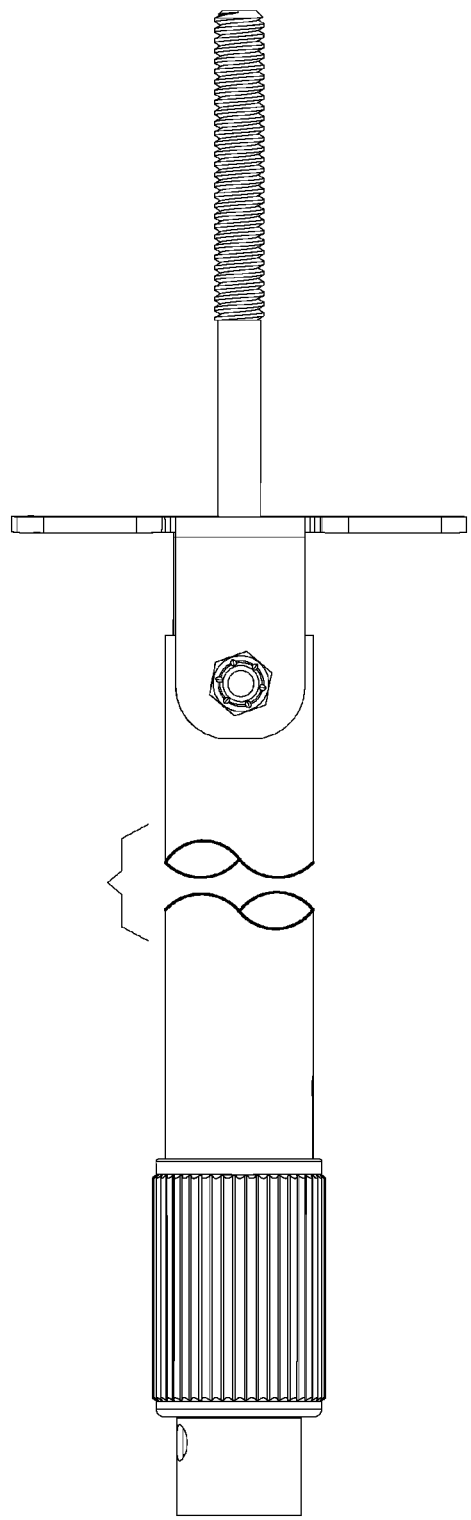 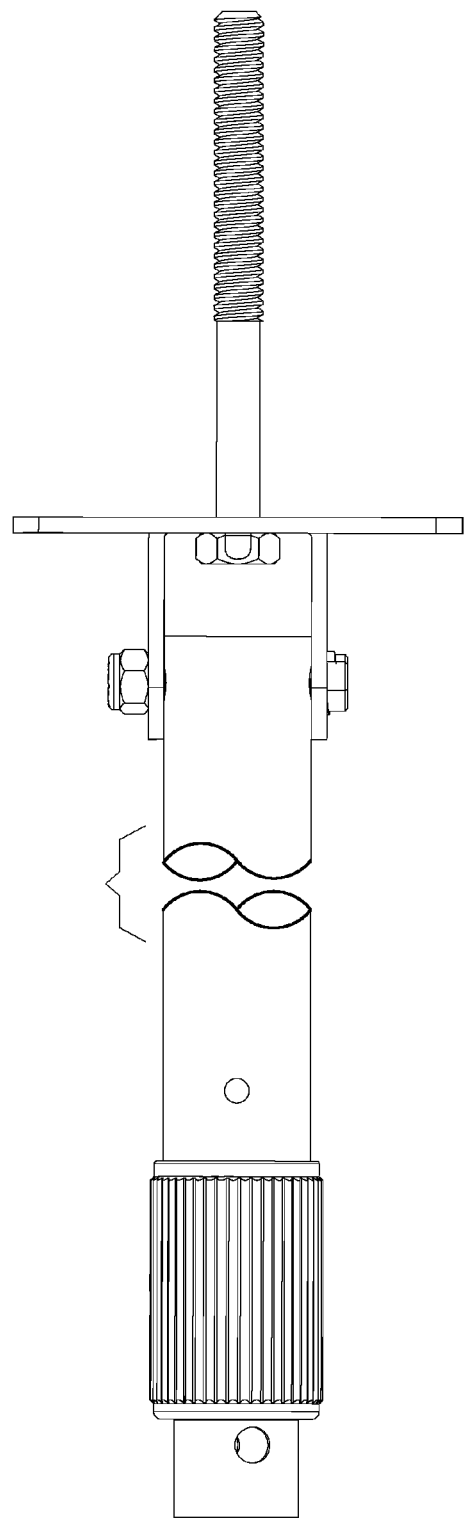
FIG. 22  FIG. 23

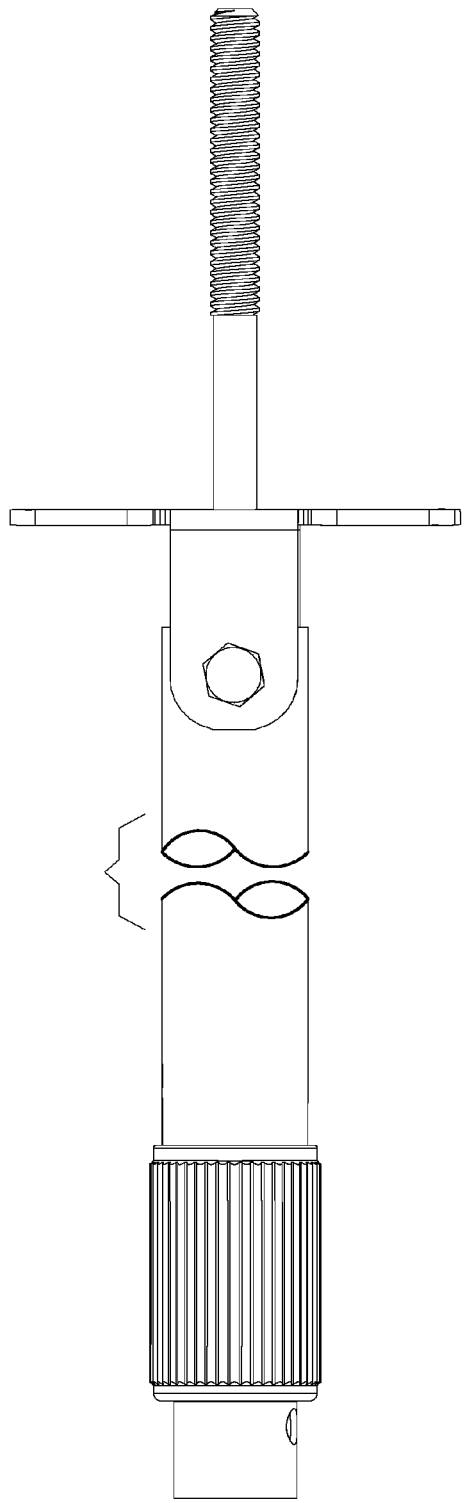 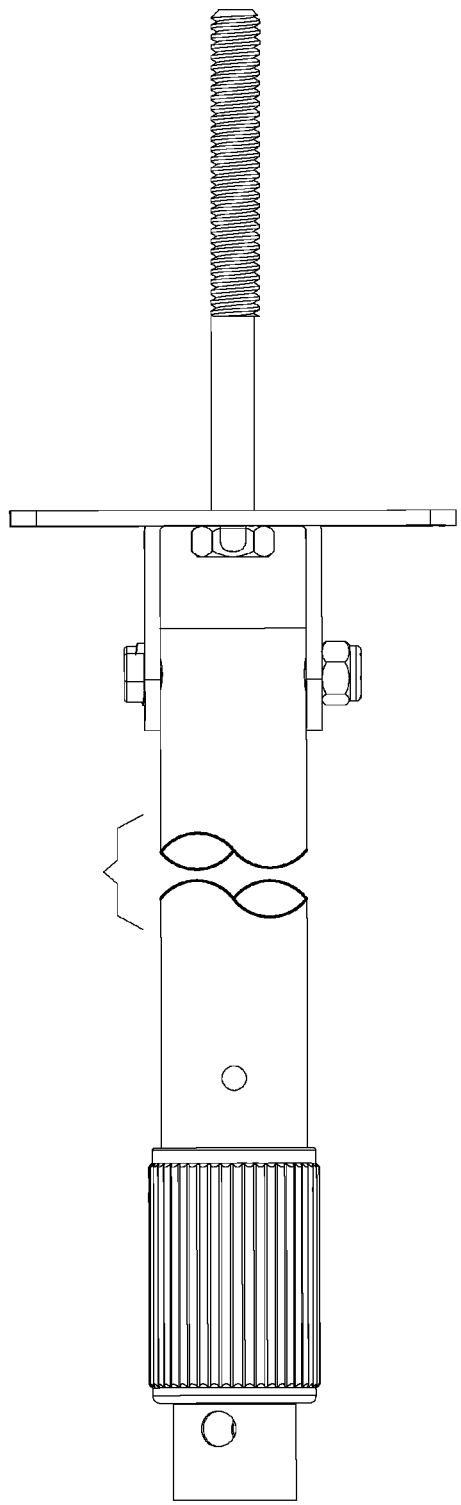
FIG. 24  FIG. 25

EQUIPMENT BOOM WITH LOCKING FEATURE

FIELD OF THE INVENTION

This invention generally relates to mounting fixtures, and more particularly to equipment booms for mounting equipment at an end thereof.

BACKGROUND OF THE INVENTION

Equipment booms are commonly employed in retail and other commercial establishments to hang equipment from a ceiling. This equipment may take a variety of forms, including but not limited to, security cameras, televisions, signage, lighting, etc. The booms are generally in the form of an extendable pole. One end thereof mounts to the ceiling. The other end thereof is used to mount the equipment thereto.

These equipment booms are typically telescopic to allow for the varying of their overall length. They also typically include a locking feature to lock them at a desired length. Unfortunately, contemporary locking features usually only permit a predetermined number of available locked positions. For example, the may include a plurality of apertures along one segment of their telescopic assembly. Each aperture is configured to receive a fastener to fix that segment's position relative to the remainder of the assembly. Further, they often times require drilling through portions of the boom to access a selected aperture in order to pass a fastener therethrough. This additional drilling operation drives up installation cost and time.

Accordingly, there is a need in the art for an equipment boom that allows for more flexible length adjustment and reduced installation cost and time. The invention provides such an equipment boom. These and other advantages of the invention, as well as additional inventive features, will be apparent from the description of the invention provided herein.

BRIEF SUMMARY OF THE INVENTION

In one aspect, embodiments of the invention provide an improved equipment boom which allows a user to finely adjust and set an axial length thereof. An equipment boom according to this embodiment includes a base member and at least one extension slideably received by the base member and moveable relative thereto. A base assembly is mounted to an end of the base member. The base assembly is configured for mounting the equipment boom to a mounting surface. A fixing arrangement is provided and configured for fixing an axial length of the at least one extension relative to the base member. The fixing arrangement includes a smooth and uninterrupted fastener receiving portion formed on the at least one extension and configured for receiving a fastener to fix an axial length of the equipment boom.

In certain embodiments according to this aspect, the equipment boom also includes a mounting assembly attached to an end of the at least one anchor extension which is configured for receiving a component. The mounting assembly is angularly adjustable about an axis perpendicular to a longitudinal axis of the boom.

In certain embodiments according to this aspect, the fixing arrangement includes a pilot aperture formed through the base member such that the fastener receiving portion is accessible through the pilot aperture. The fixing arrangement includes a locking collar arrangement for engaging the at least one extension. The locking collar arrangement includes a locking collar and an internal friction ring within the locking collar. The locking collar threadably engages a threaded end of the base member. The at least one extension extends through the friction ring. The friction ring has a variable inner diameter such that as the locking collar is threaded onto the threaded end, the inner diameter of the friction ring decreases.

In certain embodiments according to this aspect, the base assembly includes an upper plate and a lower plate. A plurality of resilient spacers are interposed between the upper plate and the lower plate.

In certain embodiments according to this aspect, the at least one extension includes a first extension and a second extension. Each of the first and second extensions provide the fastener receiving portion of the fixing arrangement.

In yet another aspect, embodiments of the present invention provide an equipment boom with improved installation time and reduced cost. An embodiment of an equipment boom according to this aspect includes a base member and at least one extension slideably received by the base member and moveable relative to the base member. A base assembly is mounted to an end of the base member. The base assembly is configured for mounting the equipment boom to a mounting surface. A fixing arrangement is configured for fixing an axial length of the at least one extension relative to the base member. The fixing arrangement includes a pilot aperture formed through the base member which is configured for receiving a fastener therethrough to fix the axial position of the at least one extension relative to the base member.

In certain embodiments according to this aspect, the fixing arrangement also includes a smooth and uninterrupted fastener receiving portion formed on the at least one extension which is configured for receiving the fastener to fix an axial length of the equipment boom.

In certain embodiments according to this aspect, the equipment boom also includes a mounting assembly attached to an end of the at least one anchor extension which is configured for receiving a component. The mounting assembly is angularly adjustable about an axis perpendicular to a longitudinal axis of the boom.

In certain embodiments according to this aspect, the fixing arrangement includes a locking collar arrangement for engaging the at least one extension. The locking collar arrangement includes a locking collar and an internal friction ring within the locking collar. The locking collar threadably engages a threaded end of the base member. The at least one extension extends through the friction ring. The friction ring has a variable inner diameter such that as the locking collar is threaded onto the threaded end, the inner diameter of the friction ring decreases.

In certain embodiments according to this aspect, the base assembly includes an upper plate and a lower plate. A plurality of resilient spacers are interposed between the upper plate and the lower plate.

In certain embodiments according to this aspect, the at least one extension includes a first extension and a second extension. Each of the first and second extensions provide the fastener receiving portion of the fixing arrangement.

In yet another aspect, a method for fixing an axial length of an equipment boom is provided. Embodiment of a method according to this aspect includes adjusting an axial position of at least one anchor extension relative to a base member relative to a longitudinal axis of the equipment boom. The method also includes aligning a fastener with a preformed pilot aperture formed through a wall of the base member.

The method also includes passing said fastener through said aperture and passing said aperture through a wall of the at least one extension.

In certain embodiments according to this aspect, the method may also include tightening a locking collar that threadably engages the base member such that a friction ring internally disposed within the locking collar frictionally engages the at least one extension.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 9-15 are various orthogonal and perspective views illustrating surface contours of the boom of FIG. 1;

FIGS. 19-25 are various orthogonal and perspective views illustrating surface contours of the boom of FIG. 16.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
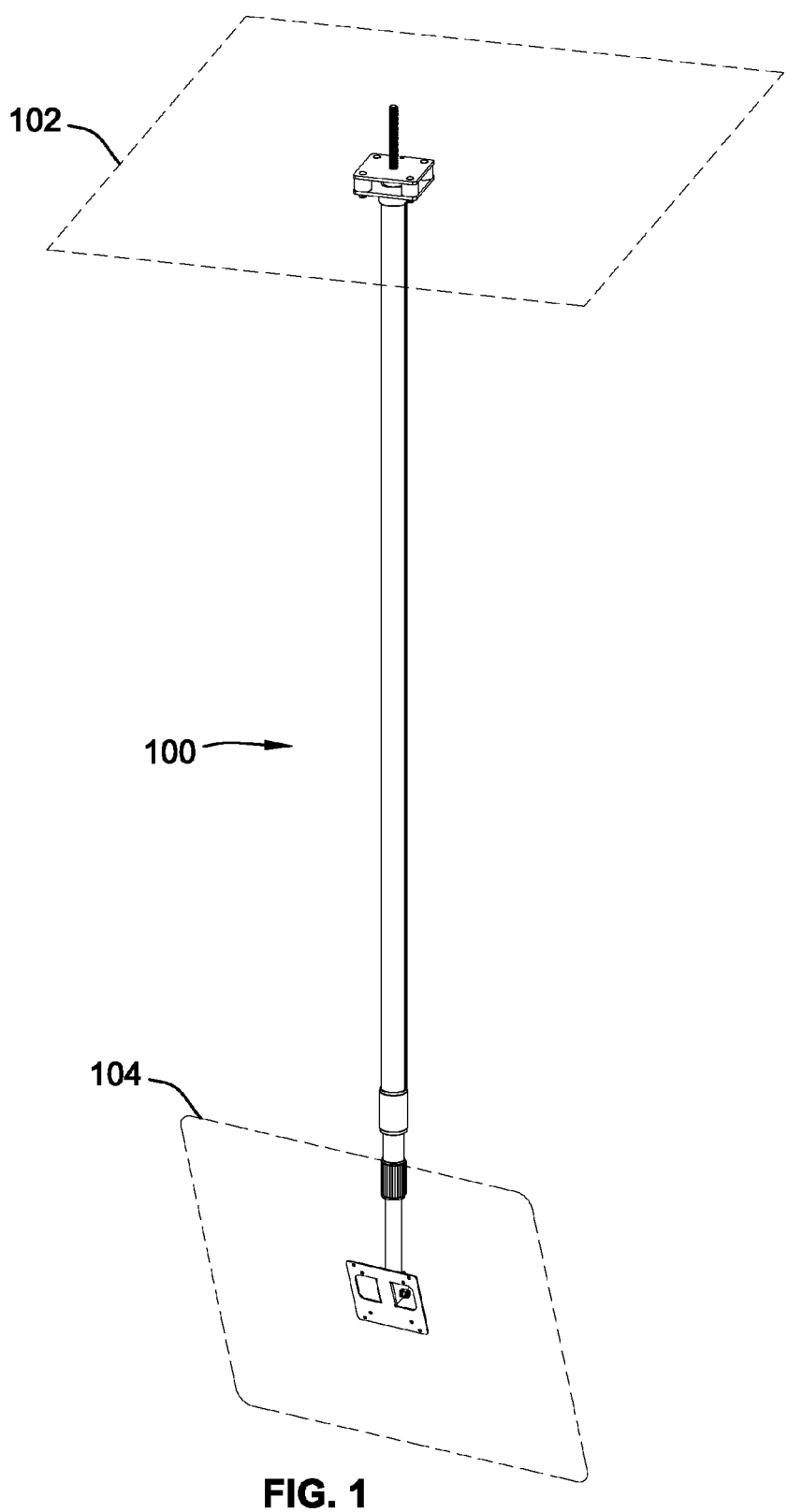
FIG. 1 is perspective view of an exemplary embodiment of an equipment boom according to the teachings of the present invention illustrated in a schematic operational environment.

Turning now to the drawings, embodiments of a boom assembly according to the invention are described herein. As will be understood from the following, the embodiments described herein advantageously overcome existing problems in the art by providing a boom assembly with a wide flexibility of length adjustment and reduced installation cost and time. With particular reference to FIG. 1, a first embodiment of a boom assembly 100 according to the instant invention is illustrated. Boom assembly 100 is shown mounted to a schematically represented mounting structure 102. Mounting structure 102 may, for example, be a ceiling panel, a structural support, or any other surface which may readily support boom assembly 100 and its associate weight. Also shown in FIG. 1, a component 104 is mounted to an end of boom assembly 100. Component 104 may for example be signage, an electronic component such as a television or security camera, or any other item that may mount to boom assembly 100.

Figure 2:
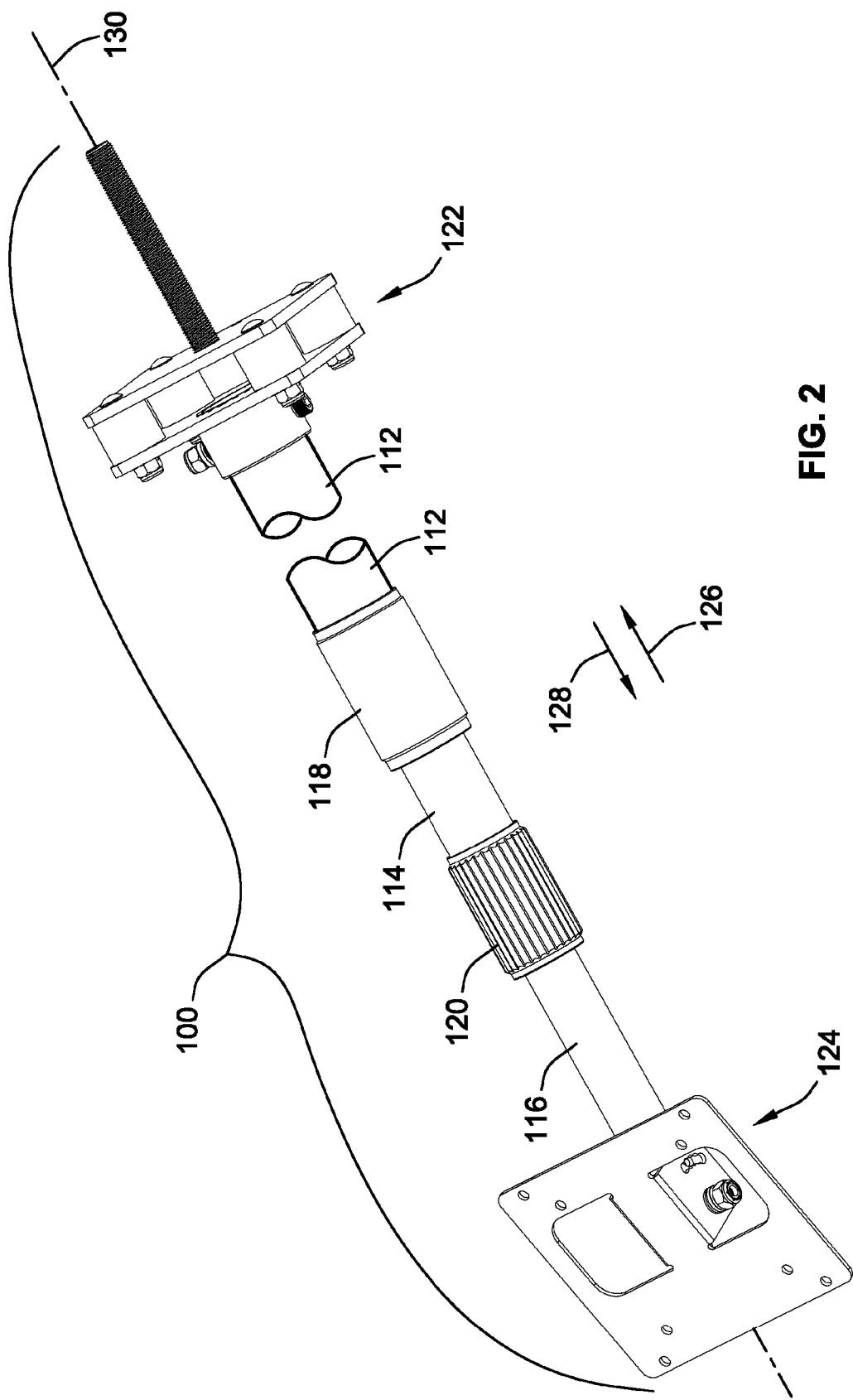
FIG. 2 is a perspective view of the boom of FIG. 1.

Turning now to FIG. 2, boom assembly 100 is telescopic in its design and includes generally cylindrical segments. More specifically, boom assembly 100 includes a generally cylindrical base member 112 having a hollow interior. A first extension 114 is slideably received within said hollow interior. Also, a second extension 116 is slideably received in a hollow interior of first extension 114. As will be explained in the following, each of first and second extensions 114, 116 are slideable relative to base member 112 to select an overall operating length of boom assembly 100. The particular length of base member 112 and first and second extensions 114, 116 shown and described herein are exemplary only. It will be readily understood that the length of base member 112 and first and second extensions 114, 116 may vary depending upon application. Regardless of the particular length, first and second extensions 114, 116 are slideable in linear directions 126, 128 along longitudinal axis 130 of boom assembly 100 to achieve the aforementioned length variation. Furthermore, fewer or greater extensions may be utilized without departing from the scope of the invention herein.

A first locking collar arrangement 118 is provided at an end of base member 112. First locking collar arrangement 118 is responsible for frictionally engaging first extension 114 to set a length of extension of first extension 114 extending outwardly from base member 112. Similarly, a second locking collar arrangement 120 is provided to frictionally engage second extension 116 to set a length of extension of second extension 116 relative to first extension 114. In the event that additional extensions are utilized, it will be readily appreciated that additional locking collar arrangements are also utilized.

Boom assembly 100 also includes a base assembly 122 utilized for mounting boom assembly 100 as described above relative to FIG. 1. At an opposite end of boom assembly 100, a mounting assembly 124 is provided for mounting a component to boom assembly 100 as also described above relative to FIG. 1.

Figure 3:
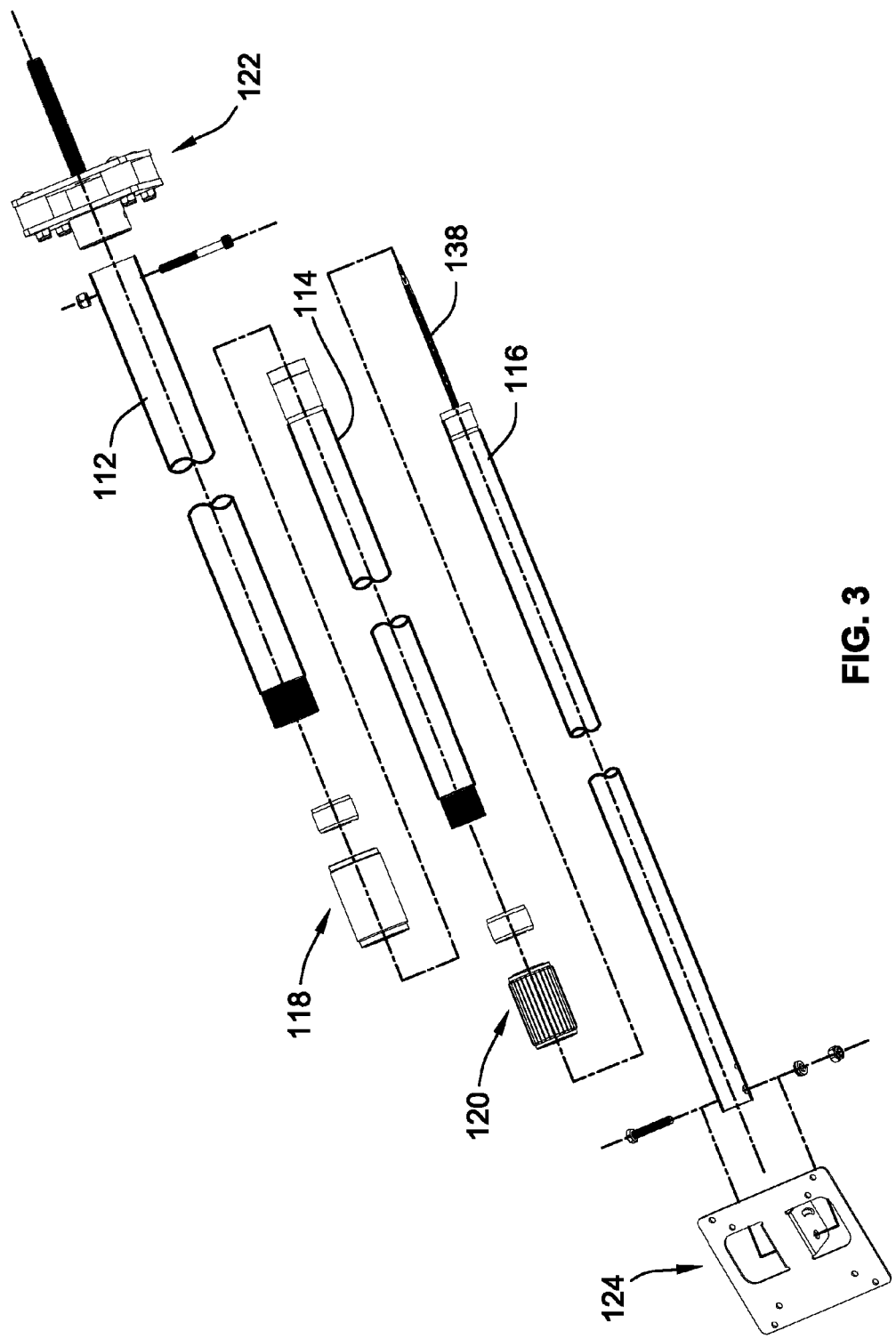
FIG. 3 is an exploded perspective view of the boom of FIG. 1.

Turning now to FIG. 3, boom assembly 100 is illustrated in an exploded view. This view illustrates the telescopic assembly of boom assembly 100. As is also shown in FIG. 3, the hollow interiors of each of base member 112 and first and second extensions 114, 116 permit the routing of lead wires 138 for powering or providing any other electrical signal to a component mounted to mounting assembly 124.

Figure 4:
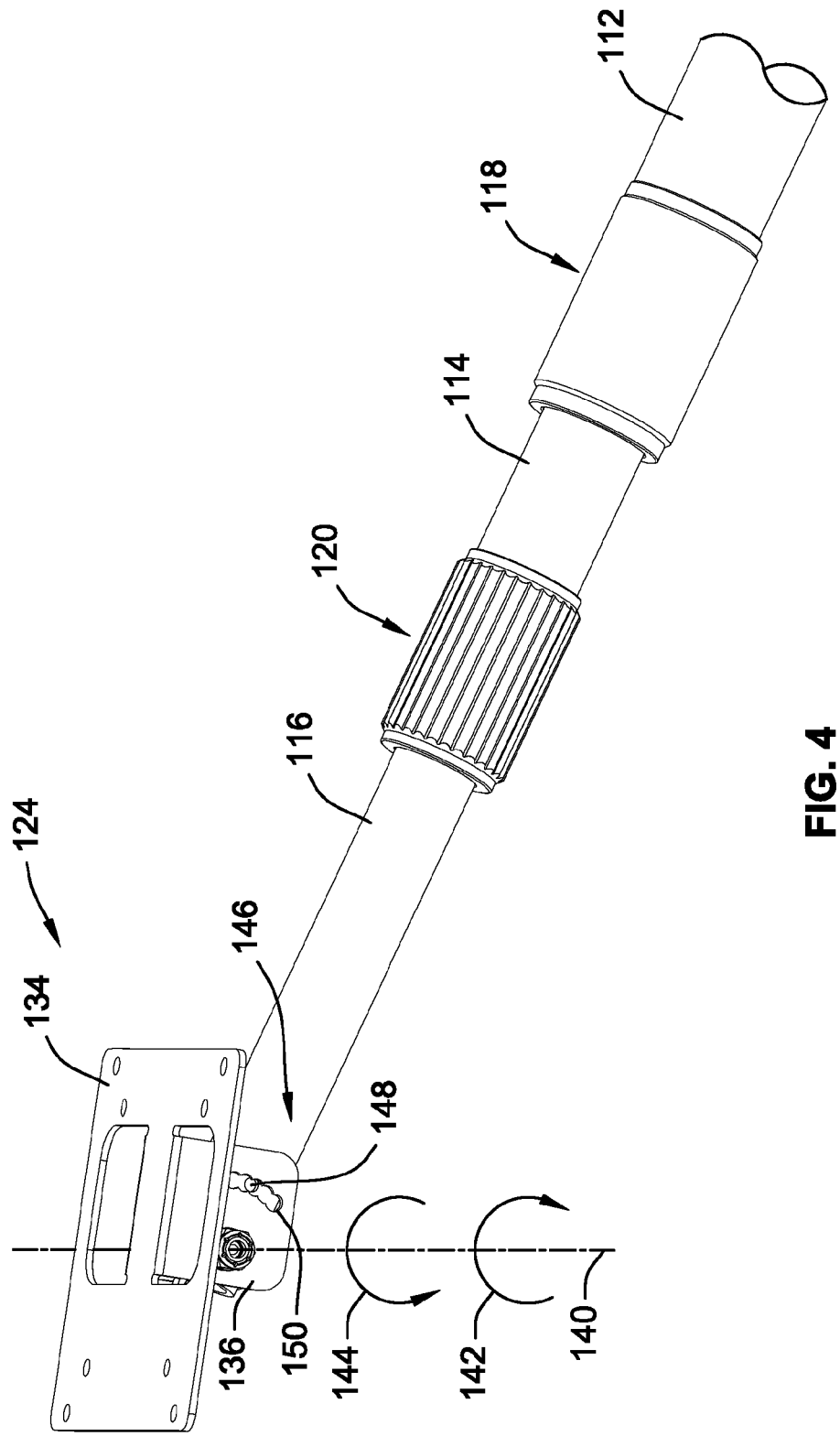
FIG. 4 is a perspective view of a mounting assembly of the boom of FIG. 1.

Turning now to FIG. 4, mounting assembly 124 is shown in greater detail. Mounting assembly 124 includes a base plate 134 and a mounting yoke 136 extending from a back surface of base plate 134. Mounting assembly 124 is rotatable in first and second rotational directions 142, 144 about axis 140 which is perpendicular to the longitudinal axis 130 of boom assembly 100 (See FIG. 2). This rotational capability allows a user to set an angle of display of a component mounted to mounting assembly 124. Mounting assembly 124 also includes an angular fixing arrangement 146 in the form of an aperture 148 and a scalloped slot 150. Scalloped slot 150 includes portions thereof which are separately alignable with aperture 148. Upon alignment, a user inserts a fastener through slot 150 and aperture 148 to fix the angular orientation of mounting assembly 124 about axis 140.

Figure 5:
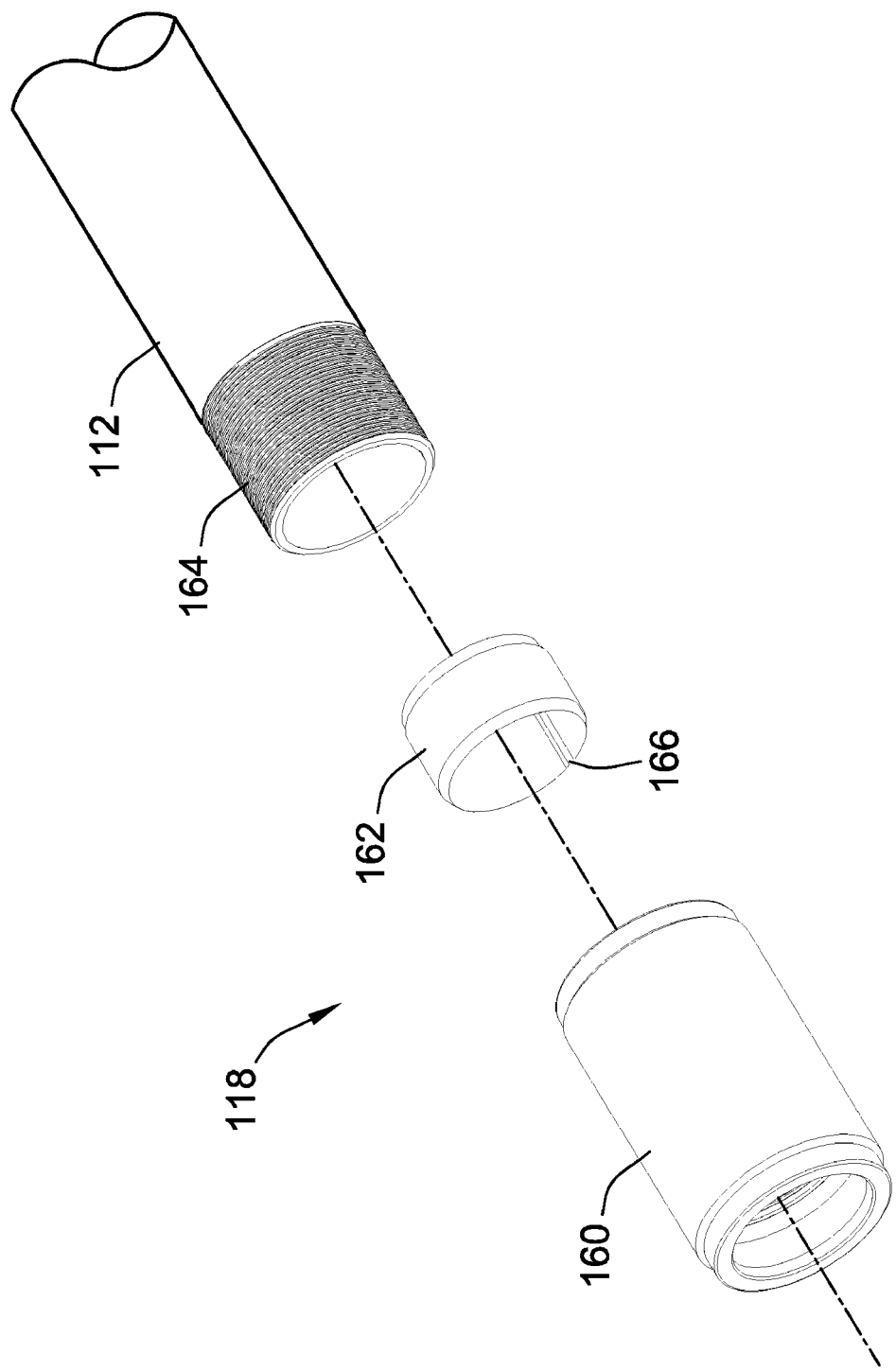
FIG. 5 is an exploded perspective view of a locking collar arrangement of the boom of FIG. 1.

Turning now to FIG. 5, the aforementioned first and second locking collar arrangements will be described in greater detail. First locking collar arrangement 118 is illustrated in FIG. 5. The following description of the operation of first locking collar arrangement 118 applies equally well to second locking collar arrangement 120. First locking collar arrangement 118 includes a collar 160 that threadably engages a threaded end 164 of base member 112. A friction ring 162 is disposed within an interior of collar 160. The maximum outer diameter of friction ring 162 is sized such that it cannot pass entirely into the interior of base member 112. As collar 160 is tightened on threaded end 164, the inner diameter of friction ring 162 will decrease. Indeed, a slot 166 is provided on friction ring 162 to allow for this decrease in inner diameter. The aforementioned decrease in the inner diameter of friction ring 162 is made possible by slot 166 in that, as collar 160 is tightened, friction ring 162 is axially compressed. This axial compression causes slot 166 to decrease in circumferential width, thus decreasing the inner diameter of friction ring 162.

Figure 6:
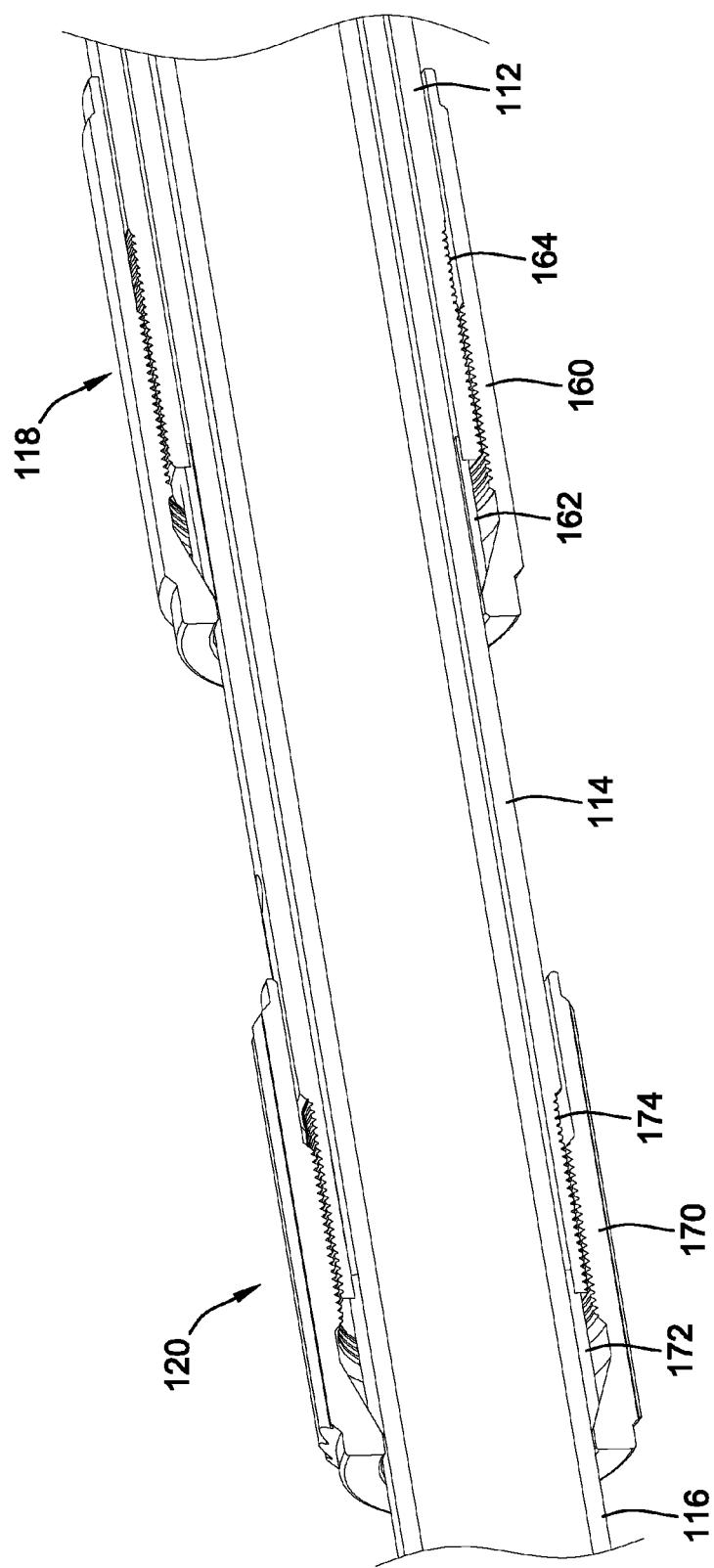
FIG. 6 is a perspective cross section of the locking collar arrangement of FIG. 5.

Turning now to FIG. 6, both first and second locking collar arrangements 118, 120 are illustrated in cross-section. As can be seen in this view, first locking collar arrangement 118 is designed to frictionally engage first extension 114. Second locking collar arrangement 120 is designed to frictionally engage second extension 116. As introduced above, second locking collar arrangement 120 is the same in its configuration and operation as first locking collar arrangement 118. Specifically, second locking collar arrangement 120 also includes a collar 170 and a friction ring 172. Collar 170 threadably engages a threaded end 174 of first extension 114.

Figure 7:
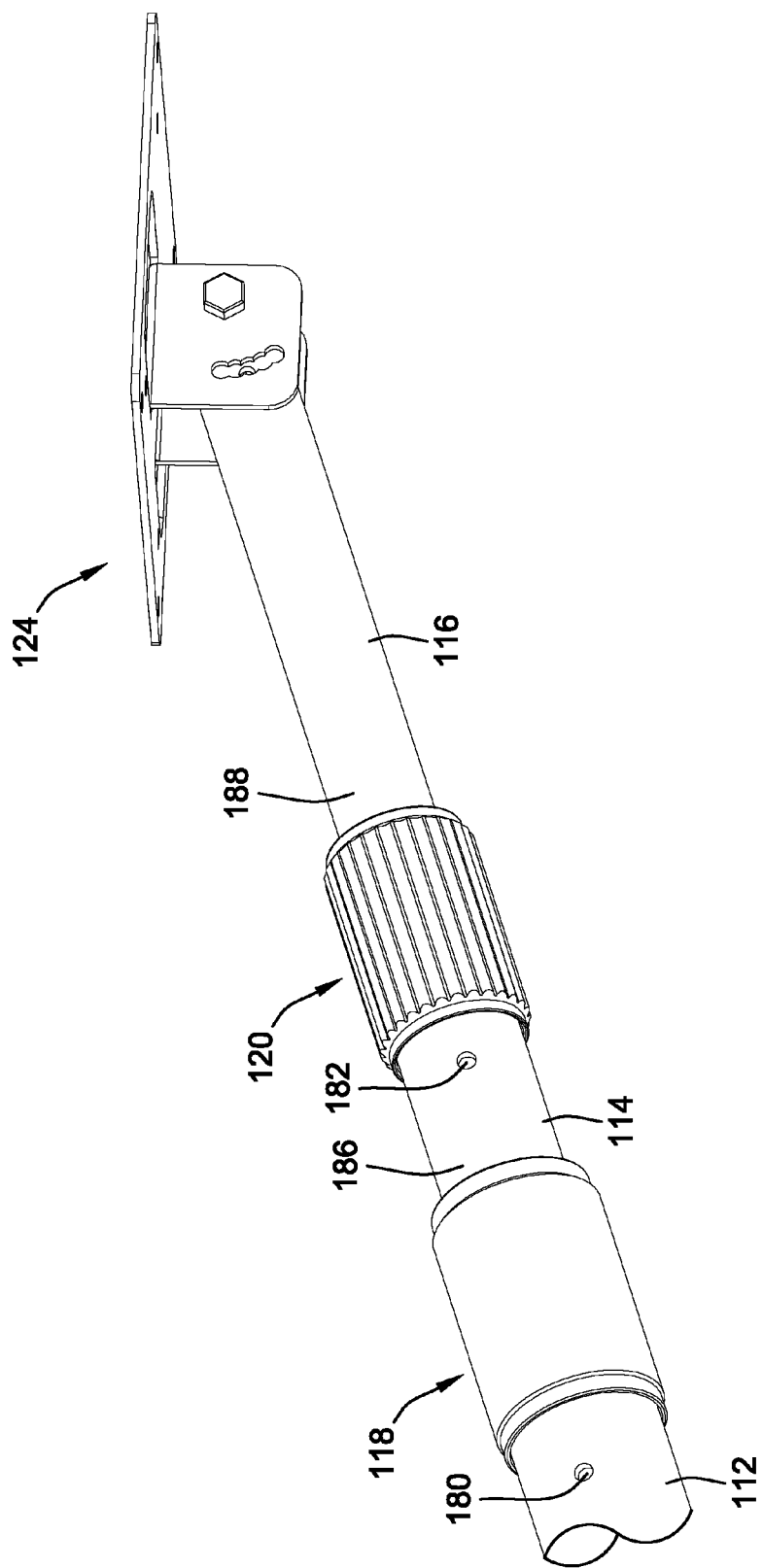
FIG. 7 is another perspective view of a portion of the boom of FIG. 1.

Turning now to FIG. 7, base member 112 includes a pilot aperture 180 formed therethrough. Pilot aperture 180 allows for a fastener to readily pass therethrough and subsequently pass through a fastener receiving portion 186 of first extension 114. Fastener receiving portion 186 is that portion of first member 114 which is accessible through pilot aperture 180, i.e., a substantial portion of the length of first extension 114. By installing the aforementioned fastener, a redundant safety feature is achieved in the event of an unexpected failure of first locking collar arrangement 118.

An identical approach is taken relative to first extension 114 and a second extension 116. That is, a pilot aperture 182 is formed through first extension 114. A fastener may be readily received through pilot aperture 182 and subsequently passed through a fastener receiving portion 188 of second extension 116. Fastener receiving portion 188 is that portion of second extension 116 which is accessible through pilot aperture 182. Accordingly, in the illustrated embodiment first and second locking collar arrangements 118, 120 pilot apertures 180, 182, and fastener receiving portions 186, 188 thus form a fixing arrangement of boom assembly 100. It will be readily recognized that the aforementioned fixing arrangement may be formed by a single locking collar arrangement, pilot aperture, and fastener receiving portion in the event that only a single extension is utilized. Further, the aforementioned fixing arrangement will include an additional locking collar arrangement, pilot aperture, and fastener receiving portion for each additional extension beyond that shown in FIG. 7 utilized. The aforementioned fixing arrangement provides two independent mechanical configurations for fixing the axial length of boom assembly 100, the first configuration formed by the locking collar arrangements 118, 120, and the second configuration being formed by the associated pilot apertures 180, 182 and fastener receiving portions 186, 188. Where a single extension is used, this redundancy is achieved by the single locking collar arrangement and the associated pilot aperture and fastener receiving portion relative thereto.

The aforementioned fasteners that may be utilized through pilot apertures 180, 182 may take any variety of mechanical fasteners including but not limited to rivets, screws, bolts, nails, pins, etc. It will also be recognized that advantageously, each of fastener receiving portions 186, 188 do not have predefined holes for receiving the aforementioned fasteners. This allows for a near infinite number of adjustable lengths of second extension 116 relative to first extension 114, and first extension 114 relative to base member 112.

Figure 8:
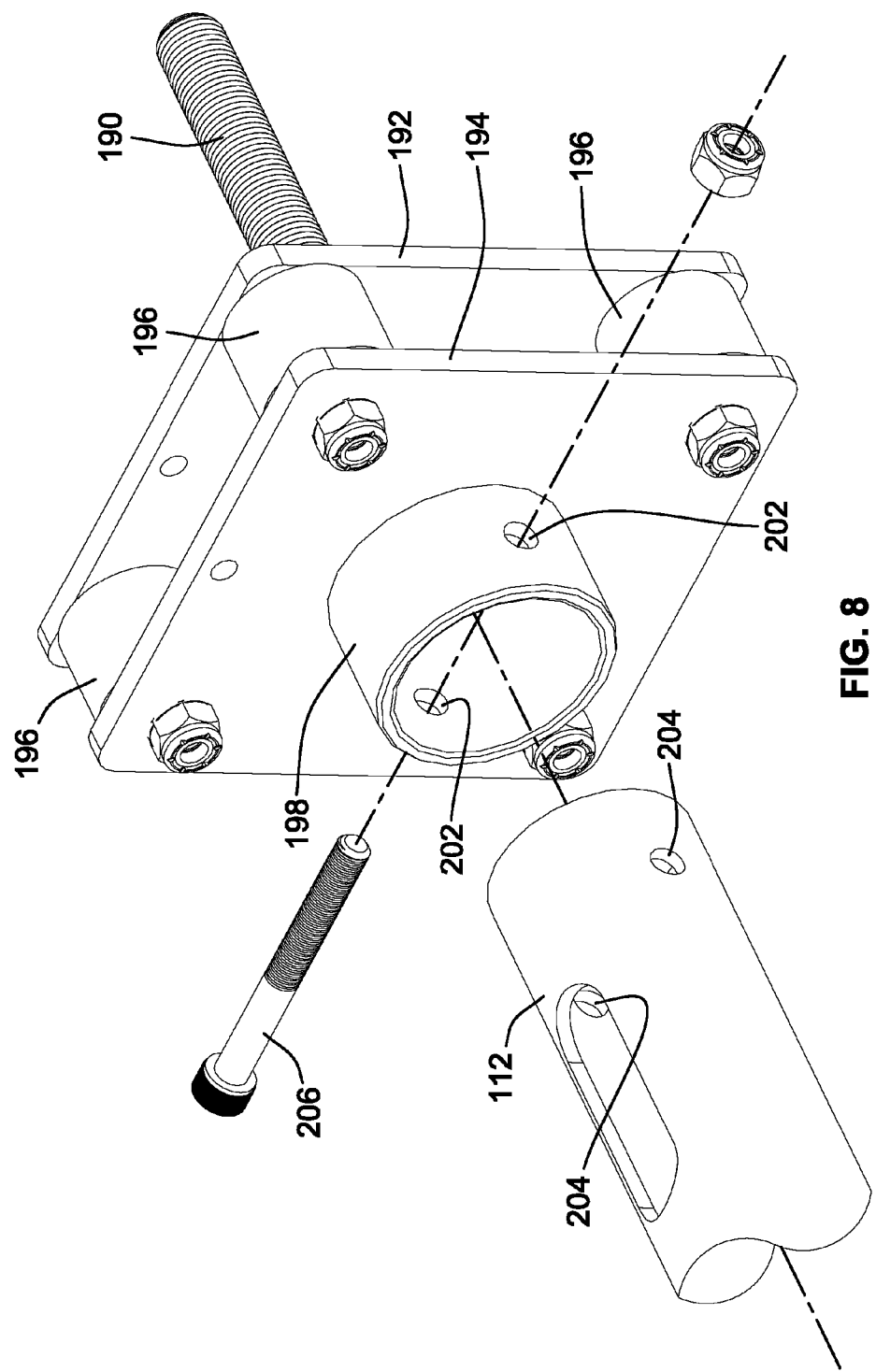
FIG. 8 is a perspective exploded view of a portion of the boom of FIG. 1, illustrating a base assembly thereof.
Figure 9:
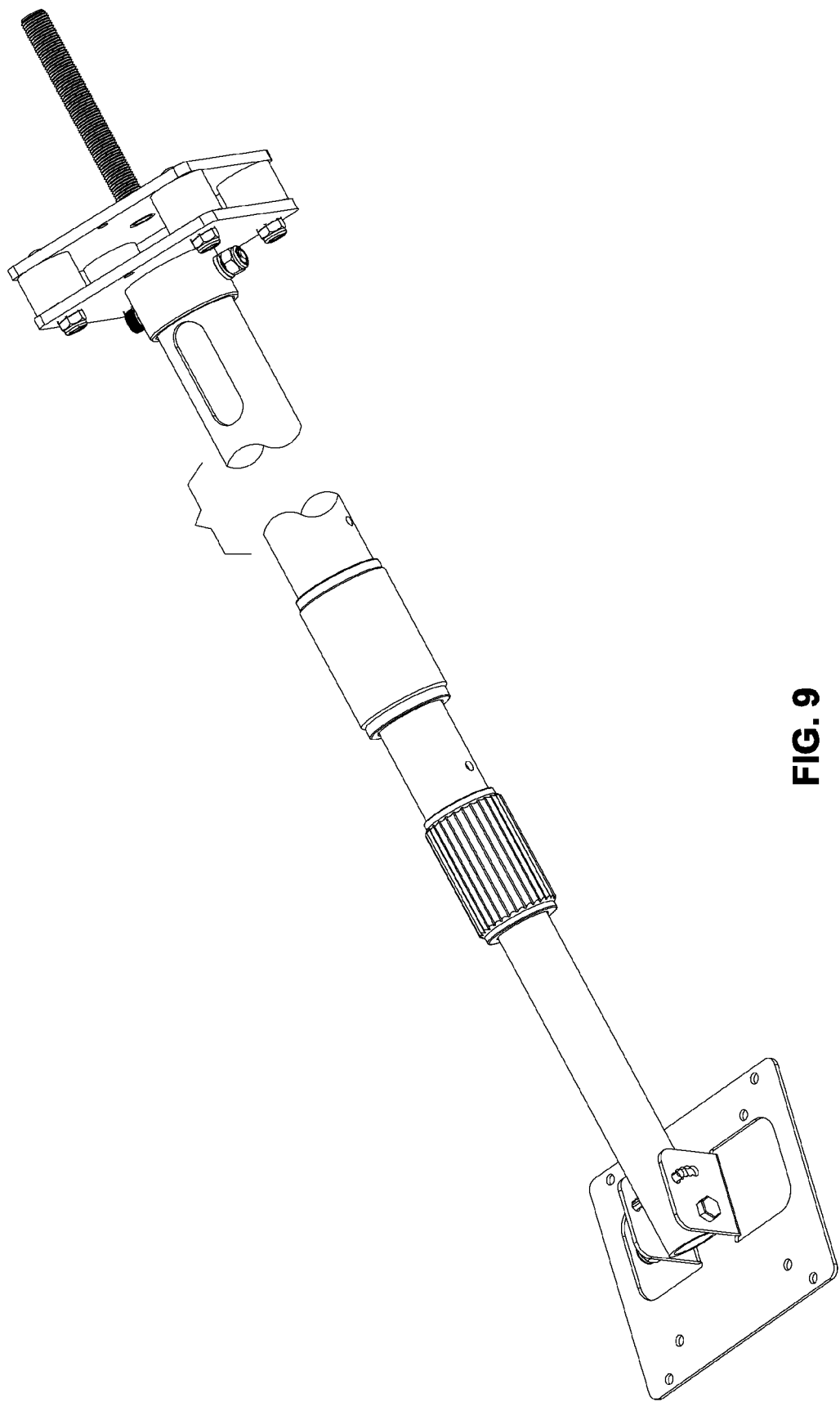
Figure 11:
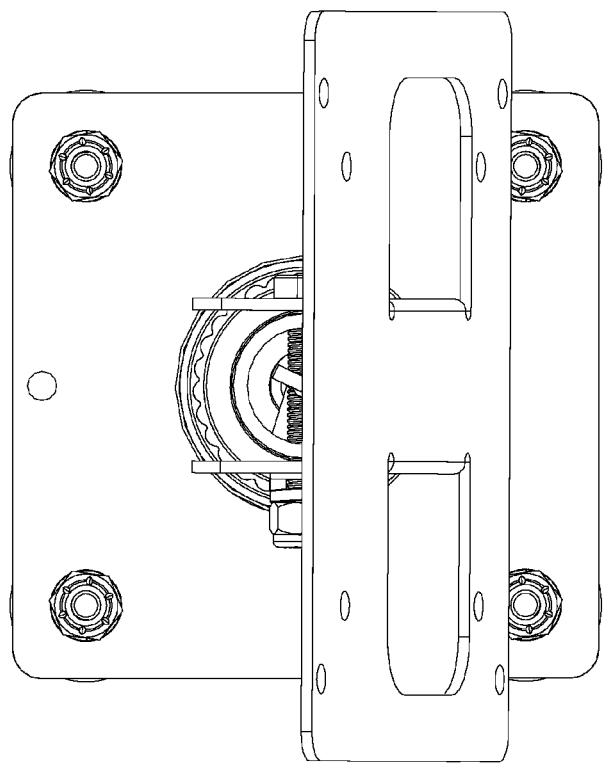
Figure 10:
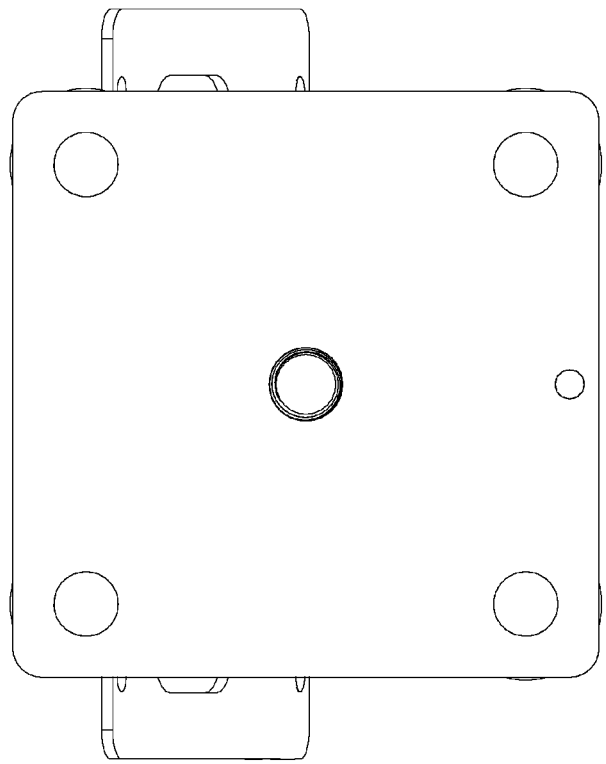

Turning now to FIG. 8, base assembly 122 is shown in greater detail. Base assembly 122 includes a mounting bolt 190 for fastening boom assembly 100 to mounting surface 102 (See FIG. 1). Base assembly 122 also includes a top plate 192 and a bottom plate 194. A plurality of resilient spacers 196 are positioned between top and bottom plates 192, 194. These resilient spacers 196 allow for flexure or movement of bottom plate 194 relative to top plate 92 to provide shock absorption in the event of unexpected movement of mounting surface 102. A mounting hub 198 extends from a back surface of bottom plate 194. Mounting hub 198 includes apertures 202 therethrough which are alignable with apertures 204 presented at an end of base member 112 as shown. A fastener 206 passes through apertures 202, 204 to affix base assembly 122 to base member 112. FIGS. 9-15 illustrate various surface contours of the embodiment described relative to FIGS. 1-8.

Figure 16:
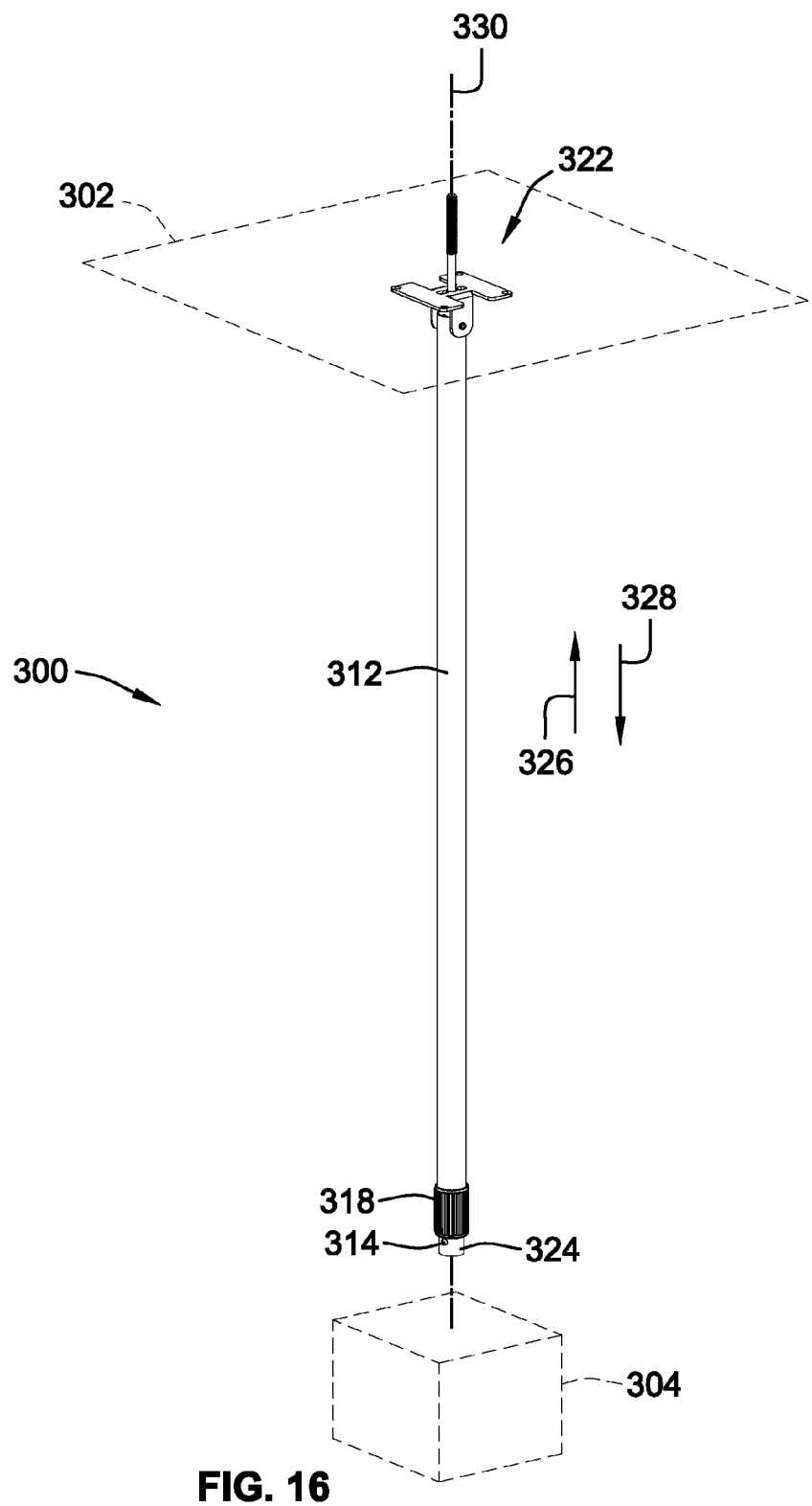
FIG. 16 is a second exemplary embodiment of an equipment boom according to the teachings of the present invention.

Turning now to FIG. 16, a second embodiment of a boom assembly 300 according to the teachings of the present invention is illustrated. This embodiment 300 is substantially similar to the embodiment described above with the exception that it only includes a single extension, and does not include a mounting assembly as shown above. Additionally, base assembly 322 of boom assembly 300 is structurally different than base assembly 122 described above.

As can be seen in FIG. 16, boom assembly 300 mounts to a mounting surface 302 in the same manner as described above. A component 304 is attachable to an end of boom assembly 300. Component 304 may for example be signage, electronics such as televisions or security devices, etc. Boom assembly 300 includes a base member 312 and a first extension 314 received within a hollow interior of base member 312. In the same manner as described above, first extension 314 is slideable relative to base member 312 in first and second linear directions 326, 328 along a longitudinal axis 330 of boom assembly 300. Boom assembly 300 also includes a locking collar arrangement 318 which is the same as those locking collar arrangements described above. First extension 314 includes a mounting end 324 which may be customized for whatever type of component 304 will mount thereto.

Figure 17:
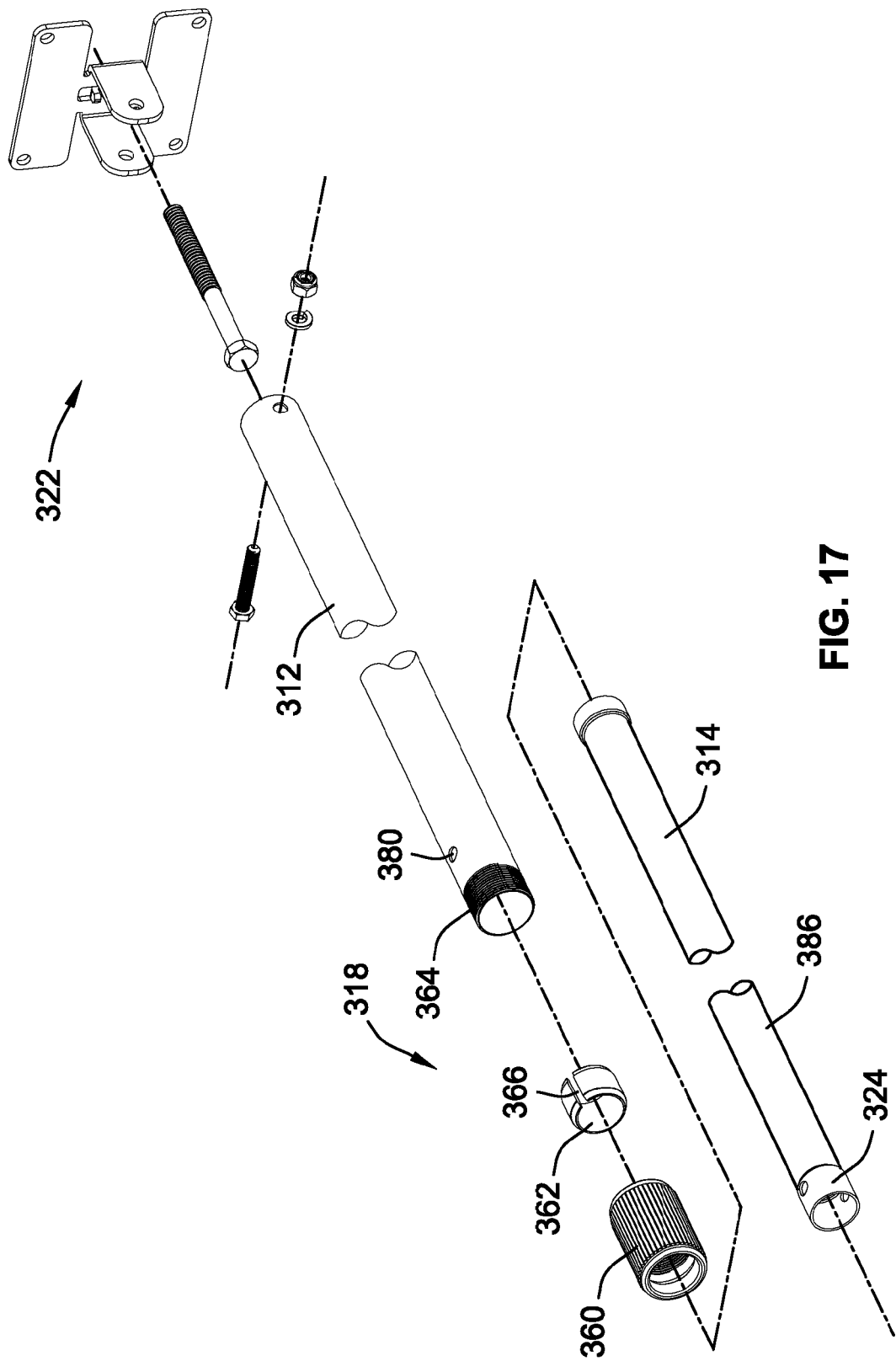
FIG. 17 is a perspective exploded view of the boom of FIG. 16.

For example, mounting end 324 may include threads, poles, or any other mechanical configuration utilized to affix components together. Turning now to FIG. 17, boom assembly 300 is illustrated in an exploded view. As can be seen in this view, locking collar arrangement 318 includes a locking collar 360, and a friction ring 362 internally disposed therein. Locking collar 360 is threadably received upon a threaded end 364 of base member 312. Friction ring 362 includes a slot 366 to permit for decreases in its inner diameter in the same manner as described above relative to friction rings 162, 172.

As a result, a length of extension of first extension 314 relative to base member 312 may be set by tightening locking collar 360 to frictionally engage first extension 314 with friction ring 362. Additionally, base member 312 includes a pilot aperture 380. A fastener may be readily received through pilot aperture 380 to subsequently pass through a fastener receiving portion 386 of first extension 314. Fastener receiving portion 386 is that portion of first extension 314 which is accessible through pilot aperture 380. Accordingly, the fixing arrangement in this embodiment is formed by locking collar arrangement 318, pilot aperture 380, and fastener receiving portion 386. This fixing arrangement also provides two independent mechanical configurations for fixing the axial length of boom assembly 300, the first configuration formed by the locking collar arrangement 318, and the second configuration being formed by the associated pilot apertures 380 and fastener receiving portion 386.

Figure 18:
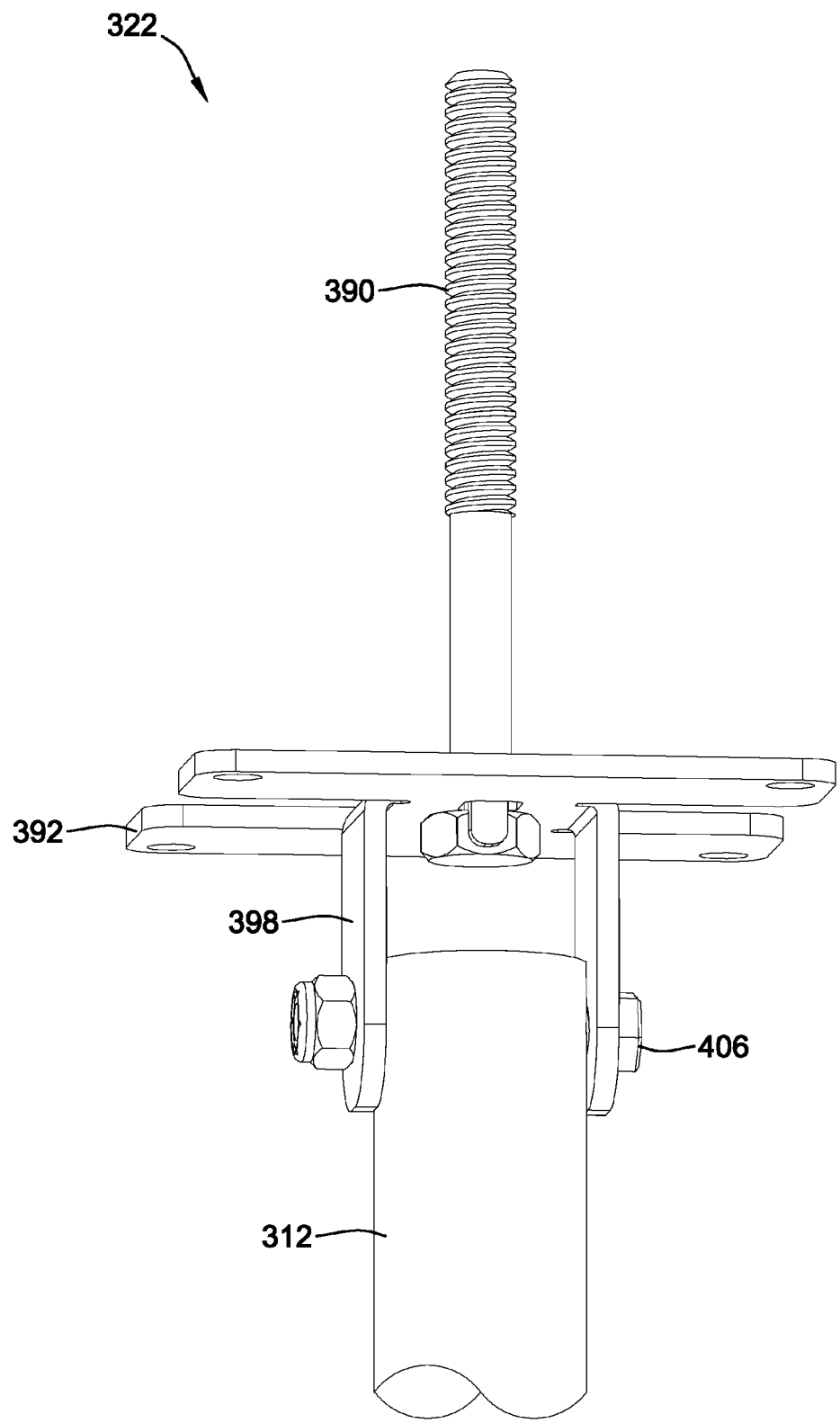
FIG. 18 is a perspective view of a base assembly of the boom of FIG. 16.
Figure 19:
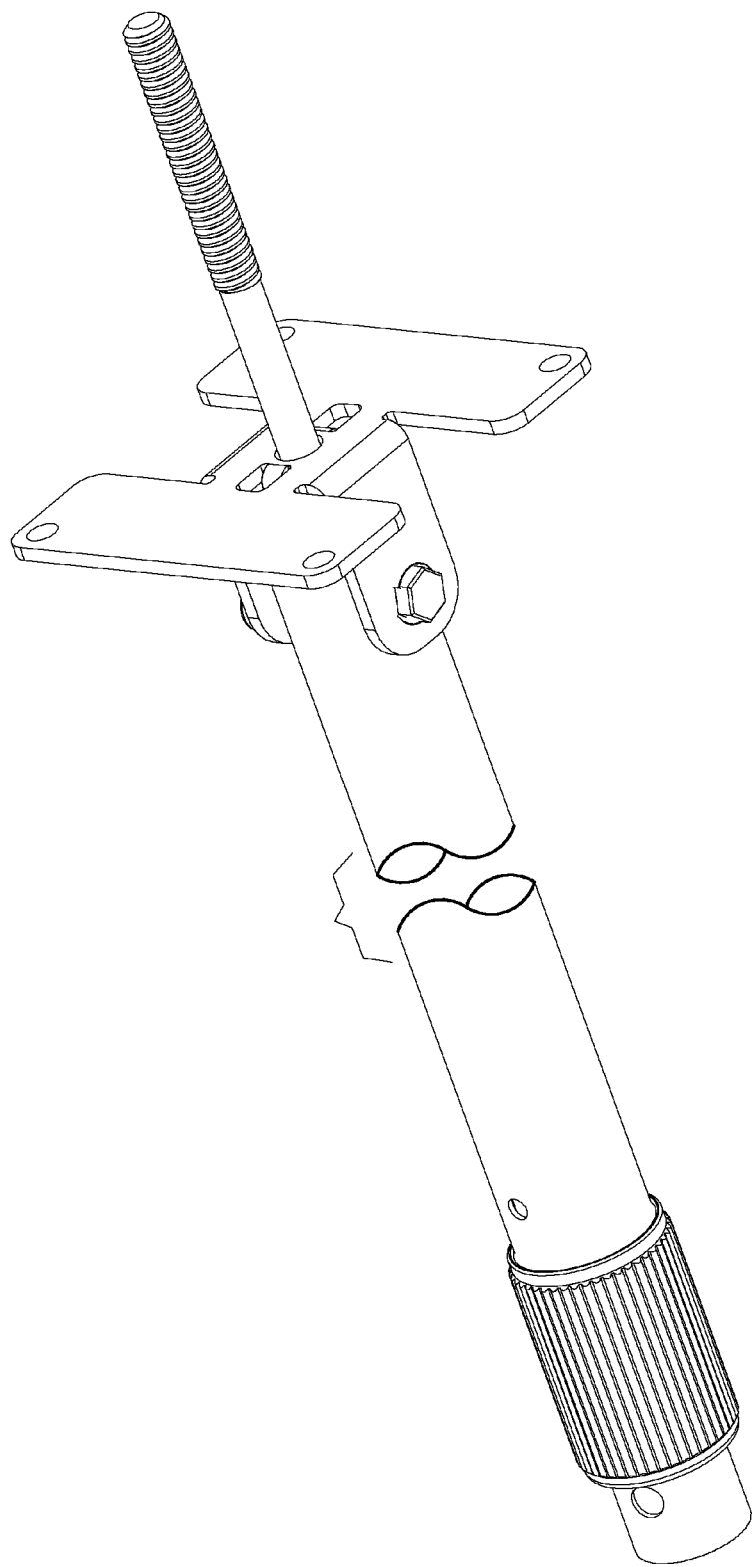
Figure 21:
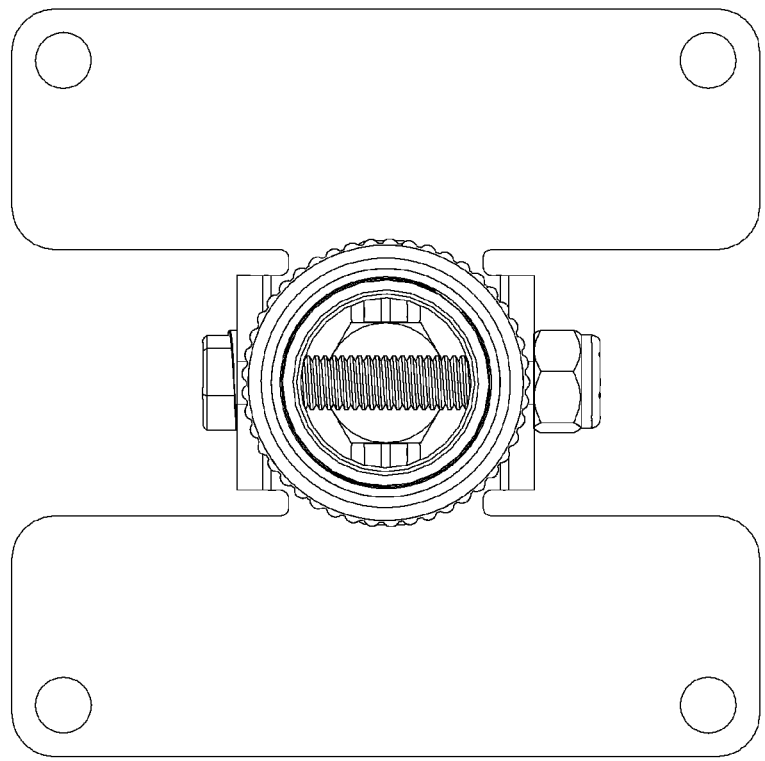
Figure 20:
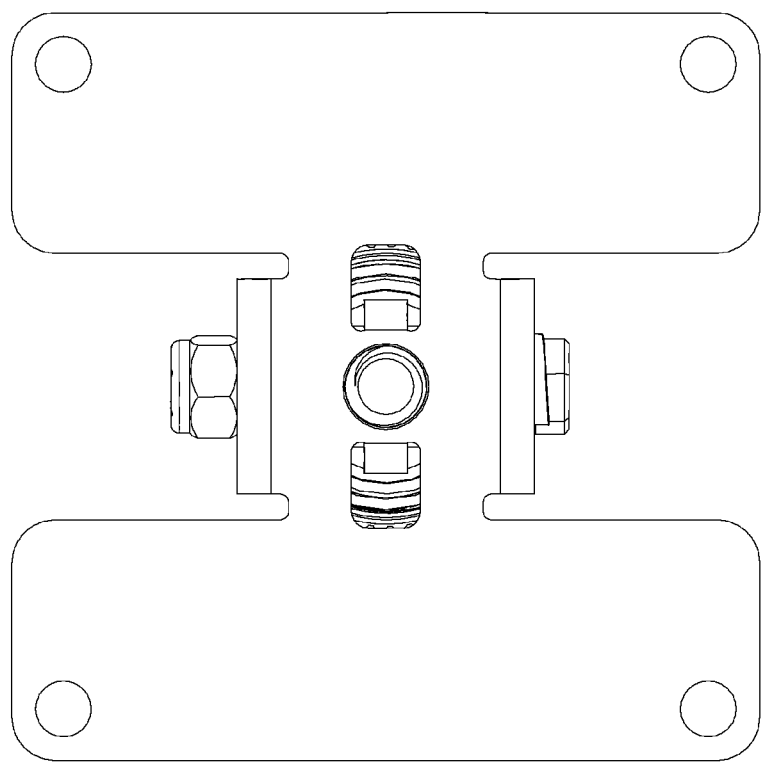

Turning now to FIG. 18, base assembly 322 is shown in greater detail. Base assembly 322 includes a mounting bolt 390 utilized for mounting boom assembly 300 to mounting structure 302. Base assembly 322 also includes a mounting plate 392. A mounting yoke 398 extends from mounting plate 392. Apertures formed in base member 312 and mounting yoke 398 (not shown) receive a fastener 406 to affix base assembly 322 to base member 312.

FIGS. 19-25 illustrate various surface contours of the embodiment described relative to FIGS. 16-18.

During installation, boom assembly 100, 300 is mounted to a mounting structure 102, 302 using base assembly 122, 322. Thereafter, a length of extension of first extension 114, 314 relative to base member 112, 312 is selected by sliding the extension 114, 314 relative to base member 112, 312 along axis 130, 330. Once at the appropriate length, locking collar arrangement 118, 318 is tightened. In the event of an additional extension such as in the embodiment of FIGS. 1-15, this process is repeated for additional extensions. Thereafter, fasteners are passed through pilot aperture and through fastener receiving portions as described above. Such a configuration allows a user to finally adjust the overall length of boom assembly 100, 300 while also quickly incorporate a redundant axial fixing feature as described above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An equipment boom for supporting a hanging component, comprising:
   a base member;
   at least one extension slidably received by the base member and movable relative to the base member;
   a base assembly mounted to an end of the base member, the base assembly configured for mounting the equipment boom to a mounting surface, wherein the base assembly includes an upper plate and a lower plate aligned with one another to define a perimeter of the base assembly, and wherein a plurality of resilient spacers are interposed between the upper plate and the lower plate such that the plurality of resilient spacers are situated at the perimeter defined by the upper and lower plates and wherein said base assembly includes a single mounting bolt extending from a top surface of said upper plate at a center of said upper plate such that the plurality of resilient spacers surround said mounting bolt; and
   a fixing arrangement configured for fixing an axial length of the at least one extension relative to the base member, wherein the fixing arrangement includes a locking collar arrangement for engaging the at least one extension to fix its position relative to the base member.

2. The equipment boom of claim 1, further comprising a mounting assembly attached to an end of the at least one extension and configured for receiving a component.

3. The equipment boom of claim 2, wherein the mounting assembly is angularly adjustable about an axis perpendicular to a longitudinal axis of the boom.

4. The equipment boom of claim 1, wherein the fixing arrangement includes a pilot aperture formed through the base member such that a fastener receiving portion is accessible through the pilot aperture.

5. The equipment boom of claim 1, wherein the locking collar arrangement includes a locking collar and an internal friction ring within the locking collar.

6. The equipment boom of claim 5, wherein the locking collar threadably engages a threaded end of the base member, and wherein the at least one extension extends through the friction ring and the friction ring has a variable inner diameter such that as the locking collar is threaded onto the threaded end, the inner diameter of the friction ring decreases.

7. The equipment boom of claim 1, wherein the at least one extension includes a first extension and a second extension, and wherein each of the first and second extensions provide a fastener receiving portion of the fixing arrangement for receiving a fastener.

8. An equipment boom for supporting a hanging component, comprising:
- a base member;
- at least one extension slidably received by the base member and movable relative to the base member;
- a base assembly mounted to an end of the base member, the base assembly configured for mounting the equipment boom to a mounting surface, and including an upper plate and a lower plate each having four corner regions and connected to one another at their respective corner regions by a plurality of bolts, wherein a resilient spacer surrounds each bolt;
- a fixing arrangement configured for fixing an axial length of the at least one extension relative to the base member;
- further comprising a mounting assembly attached to an end of the at least one extension and configured for receiving a component;
- wherein the base member and at least one extension are hollow tubular members each defining a hollow interior such that cables are routable from the mounting assembly to proximate the base assembly through said hollow interiors; and
- wherein said base member includes an elongated slot extending through a sidewall of said base member and proximate an end of said base member which connects to said base assembly, said elongated slot communicating an area exterior to said base member with the hollow interior of said base member and of said at least one extension.

9. The equipment boom of claim 8, wherein the fixing arrangement includes an uninterrupted fastener receiving portion formed on the at least one extension configured for receiving a fastener.

10. The equipment boom of claim 8, wherein the mounting assembly is angularly adjustable about an axis perpendicular to a longitudinal axis of the boom.

11. The equipment boom of claim 8, wherein the fixing arrangement includes a locking collar arrangement for engaging the at least one extension.

12. The equipment boom of claim 11 wherein the locking collar arrangement includes a locking collar and an internal friction ring within the locking collar.

13. The equipment boom of claim 12, wherein the locking collar threadably engages a threaded end of the base member, and wherein the at least one extension extends through the friction ring and the friction ring has a variable inner diameter such that as the locking collar is threaded onto the threaded end, the inner diameter of the friction ring decreases.

14. The equipment boom of claim 8, wherein the at least one extension includes a first extension and a second extension, and wherein each of the first and second extensions provide a fastener receiving portion of the fixing arrangement.

* * * * *